United States Patent [19] [11] 4,132,177
Funk [45] Jan. 2, 1979

[54] RAPID DISCHARGING HOPPER CAR AUTOMATIC DOOR LATCH

[75] Inventor: Stanley T. Funk, Cincinnati, Ohio

[73] Assignee: Ortner Freight Car Company, Cincinnati, Ohio

[21] Appl. No.: 790,319

[22] Filed: Apr. 25, 1977

[51] Int. Cl.² .................. B60P 1/56; B61D 7/02; B61D 7/26; B61D 7/28
[52] U.S. Cl. ................................. 105/310; 105/240
[58] Field of Search .......................... 105/240, 310

[56] References Cited
U.S. PATENT DOCUMENTS

| | | | |
|---|---|---|---|
| 2,166,024 | 7/1939 | Schmidt | 294/65.5 X |
| 2,893,327 | 7/1959 | Lunde | 105/240 |
| 3,166,024 | 1/1965 | Hamilton | 105/240 |
| 3,187,684 | 6/1965 | Ortner | 105/310 X |
| 3,596,608 | 8/1971 | Aguino | 105/240 X |
| 3,710,729 | 1/1973 | Schuller | 105/240 |
| 3,772,996 | 11/1973 | Schuller | 105/240 |

Primary Examiner—Albert J. Makay
Assistant Examiner—Howard Beltran
Attorney, Agent, or Firm—Melville, Strasser, Foster & Hoffman

[57] ABSTRACT

Automatic latch means for the door-actuating beam of a hopper car of the type having a plurality of hopper doors arranged in opposed pairs and swingable between a closed position and a downwardly depending open position when the door-actuating beam is shifted longitudinally by the piston of a fluid cylinder between a retracted door-closing position and an extended door-opening position. The latch means comprises a catch asembly mounted on the hopper car frame and a pivotable hook operatively attached to the door-actuating beam. When the door-actuating beam is in its door-closing position the catch assembly will be engaged by the hook and means are provided to maintain this engagement under all dynamic conditions of the hopper car. As a consequence, movement of the door-actuating beam to open the hopper doors is prevented and the hopper doors are thus locked in their closed positions. The cylinder piston is provided with a clevis operatively connected to the door actuating beam. The hook is configured to be contacted and pivoted out of engagement with the catch assembly by the clevis as the clevis is advanced by the cylinder piston to shift the door-actuating beam to its door-opening position. The operative connection between the piston clevis and the door actuating beam is such that, as the clevis is advanced by the piston, it will disengage the hook from the catch assembly before it will begin to shift the door-actuating beam to its door-opening position. Means are also provided to prevent disengagement of the hook from the catch assembly and shifting of the door-actuating beam toward its door-opening position when impacted inertia tends to advance the piston and clevis.

6 Claims, 17 Drawing Figures

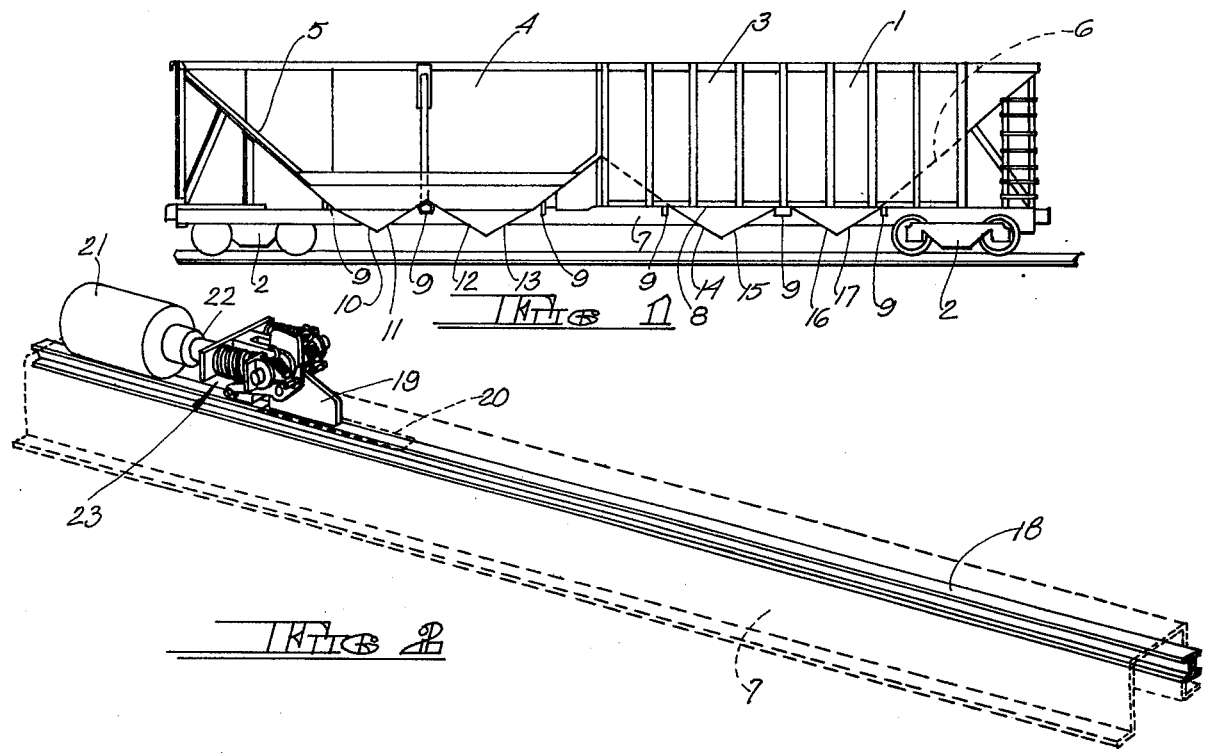
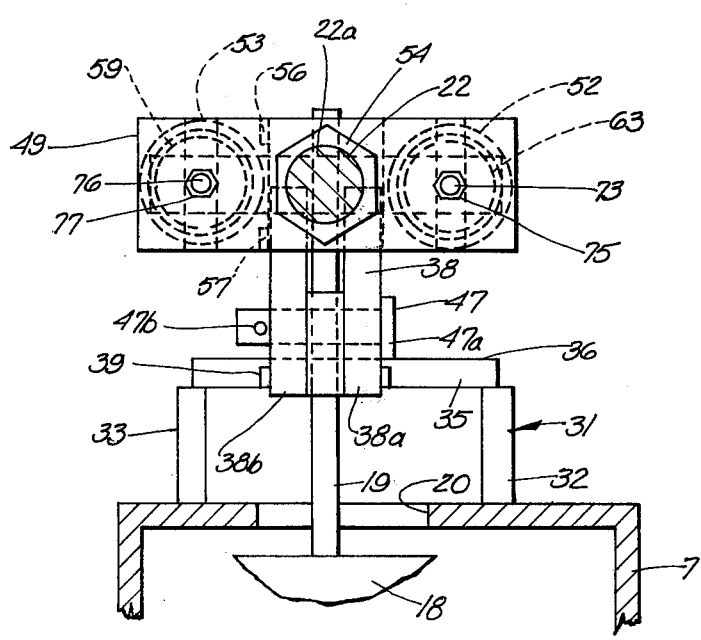

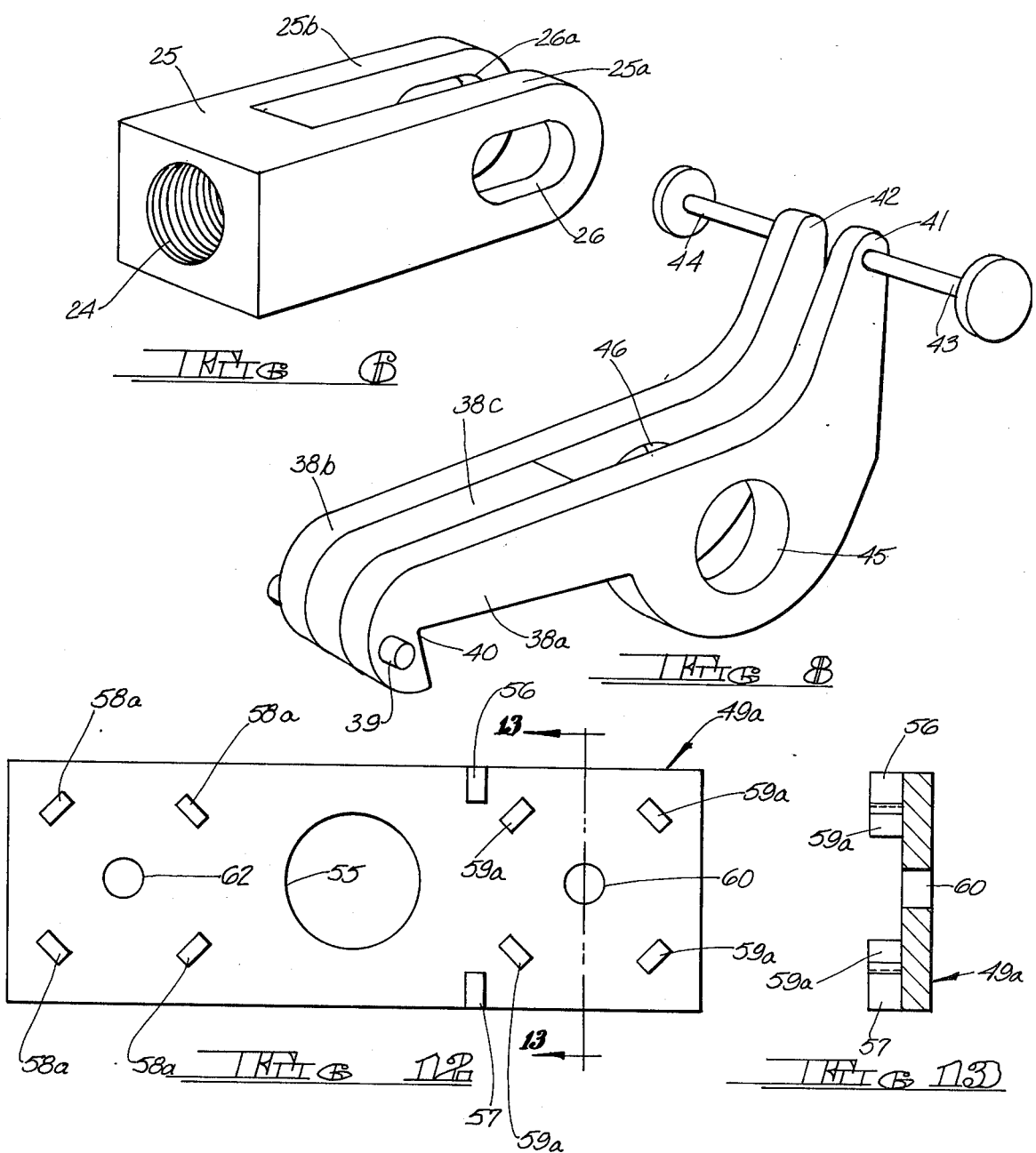

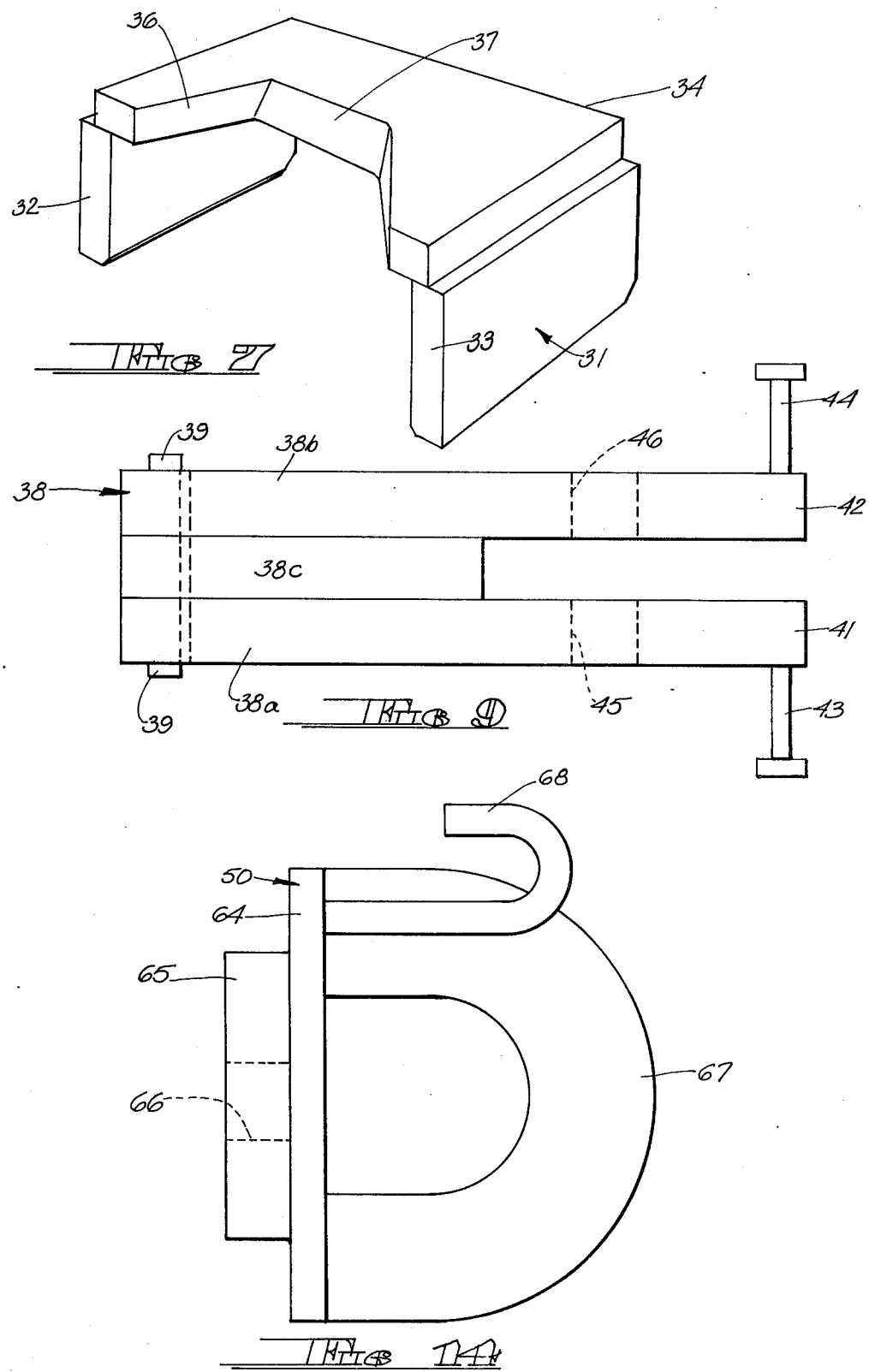

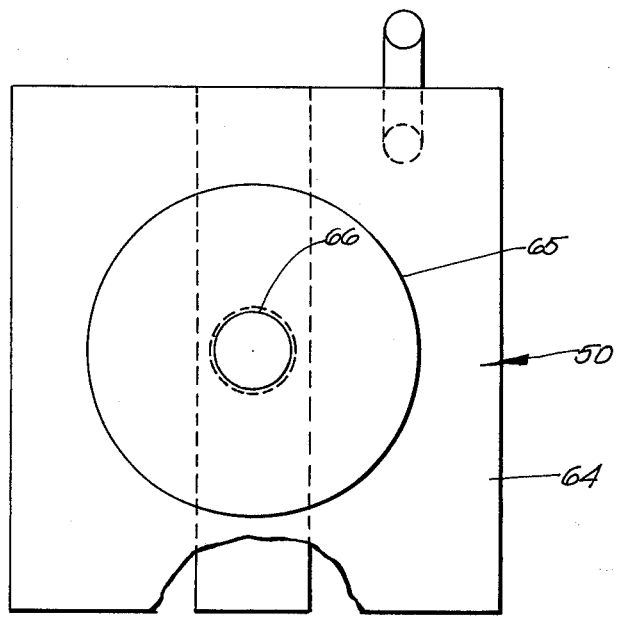
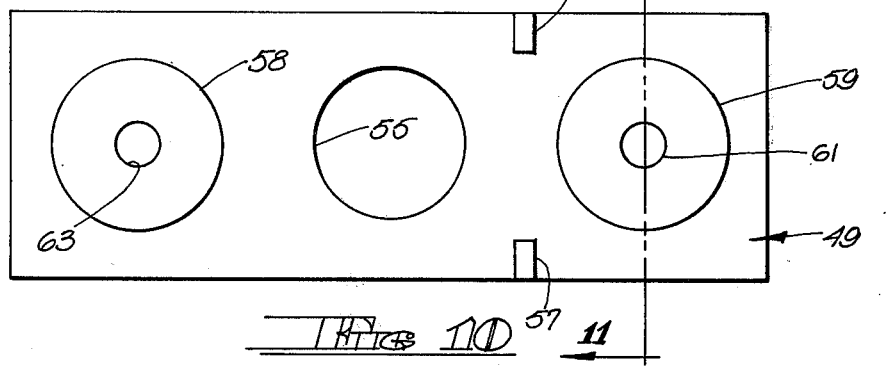
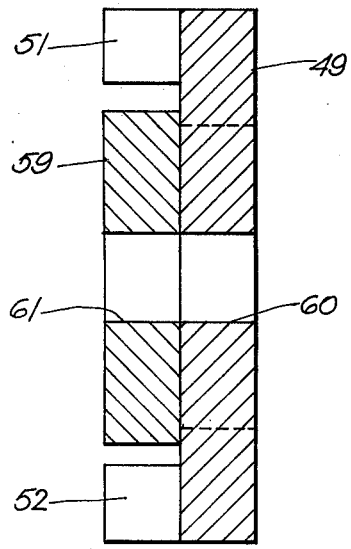

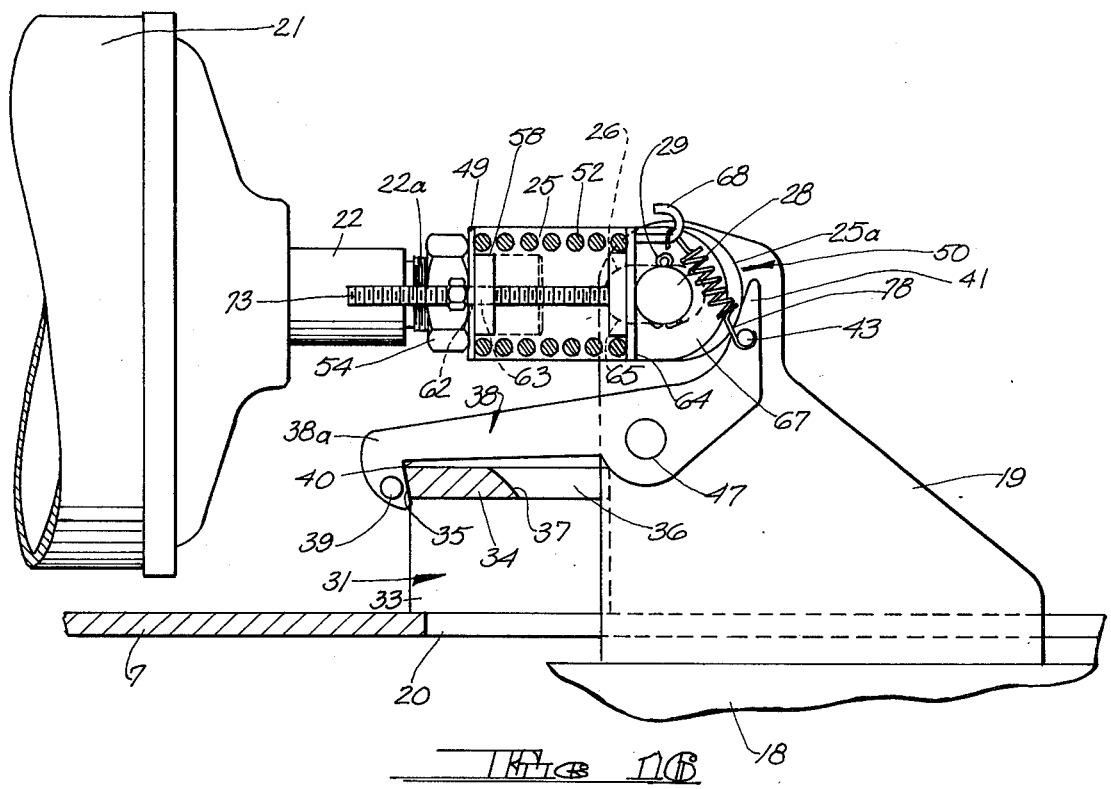
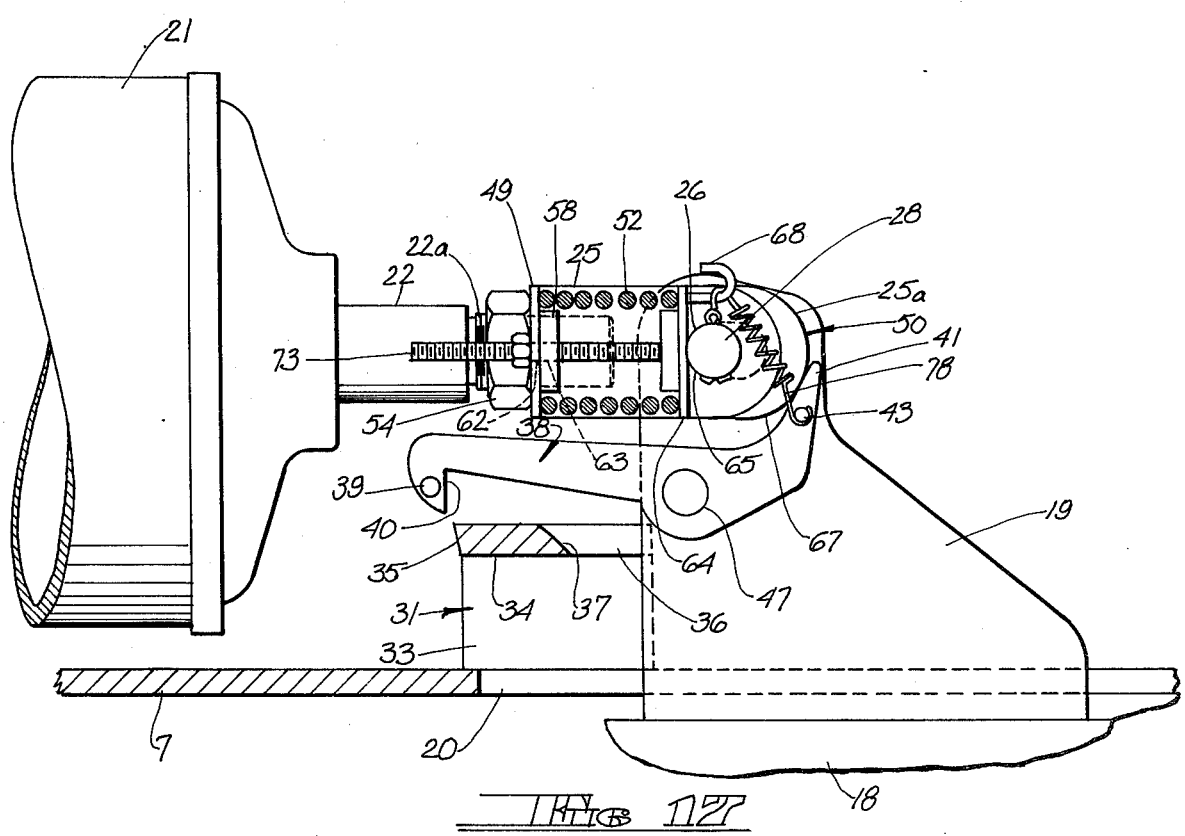

RAPID DISCHARGING HOPPER CAR AUTOMATIC DOOR LATCH

BACKGROUND OF THE INVENTION

1. Field of the Invention

The invention relates to an automatic latch means for a hopper car door actuator, and more particularly to such a latch means which will automatically lock to the hopper car frame the door actuator in its closed position under all dynamic conditions of the hopper car, until purposefully released.

2. Description of the Prior Art

Heretofor the discharge doors of a hopper car have generally been opened and closed manually, each door being provided with its own manually actuated latch means by which it may be locked in its closed position. More recently, hopper cars have been made of greater size and capacity with larger and heavier hopper doors. Prior art workers have devised for such cars various types of automatic door actuating means by which the hopper doors may be mechanically opened and closed. At the same time, various types of latch means have been developed to lock the door actuating means in its door-closing position, thereby maintaining the hopper doors in their closed position. Examples of such latch means are taught in U.S. Pat. Nos. 2,893,327; 3,166,024; 3,710,729 and 3,772,996.

Prior art door actuator latch means have frequently been characterized by complex structure and have been difficult and expensive to manufacture and assemble. Furthermore, many of the prior art latch means were of such nature that under certain dynamic conditions of the hopper car (including humping, train shocks, train action and slack run-in and run-out) the latch means would unintentionally assume an unlatched condition with the possible risk of unwanted discharge of the car load.

The present invention provides an automatic latch means for a hopper car door actuator of the type comprising a link or beam shiftable longitudinally by a fluid cylinder between door opening and door closing positions. The automatic latch means of the present invention is intended to overcome the deficiencies enumerated above, being characterized by simplicity of construction and ease of manufacture and installation. The latch means is positive in its action under all dynamic conditions of the hopper car and is provided with means to prevent inadvertent unlatching when impact inertia tends to extend the piston rod of the fluid cylinder.

SUMMARY OF THE INVENTION

The invention is directed to automatic latch means for the door-actuating link or beam of a hopper car of the type having a plurality of hopper doors arranged in opposed pairs. The hopper doors are swingable between a closed position and a downwardly depending open position when the door actuating link or beam is shifted longitudinally by the piston of a fluid cylinder between a retracted door-closing position and an extended door-opening position.

The latch means itself comprises a catch assembly permanently mounted on the hopper car frame and a pivotable hook operatively attached to the door-actuating link or beam. The fluid cylinder which longitudinally shifts the door-actuating limit or beam is operatively connected thereto by means of a clevis.

When the door-actuating link or beam is in its door-closing position, the catch assembly will be engaged by the pivotable hook and means are provided to maintain this engagement under all dynamic conditions of the hopper car.

The hook of the latch means is configured to be contacted and pivoted out of engagement with the catch assembly by the clevis as the clevis is advanced by the cylinder piston to shift the door-actuating beam to its door opening position. The operative connection between the clevis and the door-actuating link or beam is such that initial movement of the clevis will cause this disengagement of the hook from the catch assembly prior to shifting of the door-actuating link or beam by the clevis.

Finally, a spring assembly is provided to prevent unwanted disengagement of the hook from the catch assembly due to impact inertia tending to advance the piston and clevis. The spring assembly in cooperation with the latch means retards shifting of the piston and clevis due to impact inertia and the spring system must be overcome prior to purposeful unlocking of the latch means and shifting of the door-actuating link or beam.

BRIEF DESCRIPTION OF THE DRAWINGS

FIG. 1 is a semi-diagramatic elevational view, with parts in cross section, of an exemplary hopper car to which the latch means of the present invention may be applied.

FIG. 2 is a fragmentary perspective view of the center sill, door-actuating beam and cylinder of the hopper car of FIG. 1 with the latch means of the present invention applied thereto.

FIG. 5 is a fragmentary cross sectional view taken along section line 5—5 of FIG. 3.

FIG. 6 is a perspective view of the clevis of the present invention.

FIG. 7 is a perspective view of the catch assembly of the present invention.

FIG. 8 is a perspective view of the latch hook of the present invention.

FIG. 9 is a plan view of the latch hook of FIG. 8.

FIG. 10 is a front elevational view of the spring base of the present invention.

FIG. 11 is a cross sectional view taken along section line 11—11 of FIG. 10.

FIG. 12 is a front elevational view of an alternate spring base of the present invention.

FIG. 13 is a cross sectional view taken along section line 13—13 of FIG. 12.

FIG. 14 is a side elevational view of the spring retainer of the present invention.

FIG. 15 is a fragmentary front elevational view of the spring retainer of FIG. 8.

FIG. 16 is a fragmentary elevational view (partly in cross section) similar to FIG. 3 but illustrating the clevis in its position when it first contacts the latch hook.

FIG. 17 is a fragmentary elevational view (partly in cross section) similar to FIGS 3 and 17, and illustrating the clevis in its position upon disengagement of the latch hook from the catch assembly.

DESCRIPTION OF THE PREFERRED EMBODIMENTS

Figure 4:
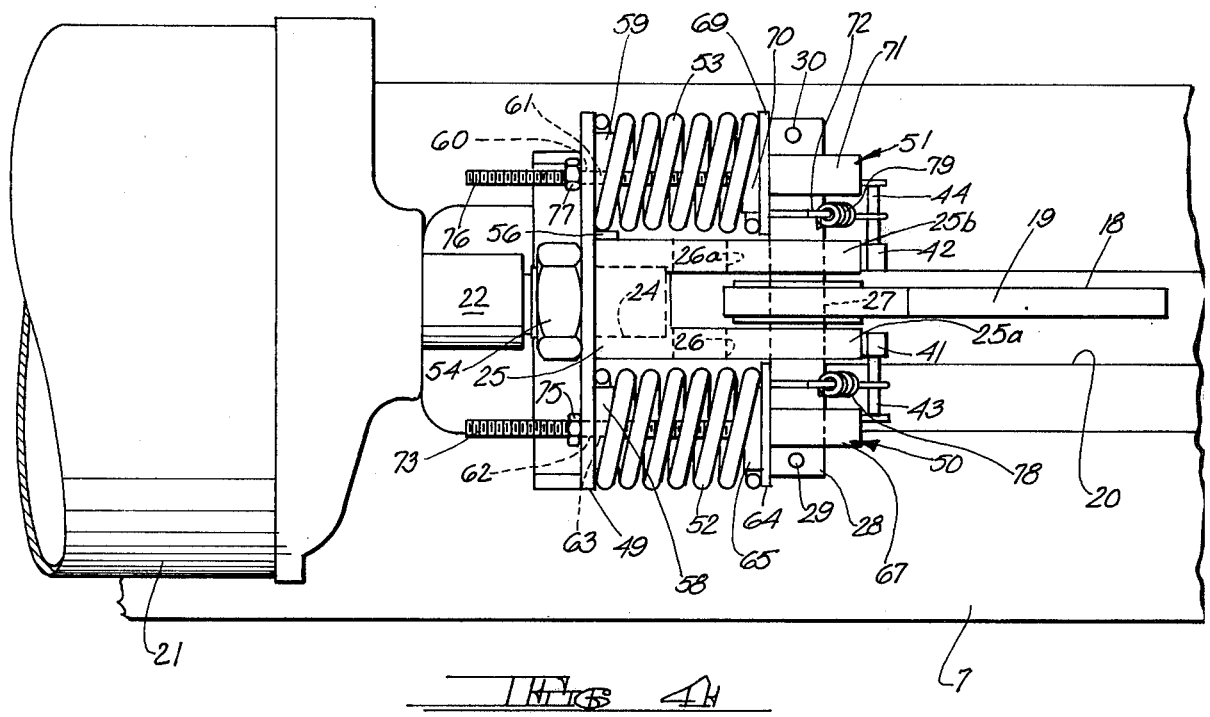
FIG. 4 is a fragmentary plan view of the structure of FIG. 3.

The latch means of the present invention is for use on that kind of hopper car, the doors of which are opened and/or closed through the agency of a door-actuating link or beam shiftable longitudinally by a fluid cylinder. While not intended to be so limited, for purposes of an exemplary showing the latch means will be described in its application on a modern hopper car of the type taught in U.S. Pat. No. 3,596,609. Such a hopper car is illustrated in FIG. 1 and comprises an elongated body generally indicated at 1, mounted on conventional trucks 2. The car body comprises vertical side walls 3 and 4 together with inclined end walls or slope sheets 5 and 6.

The body 1 is mounted on an under frame comprising a longitudinally extending center sill 7, longitudinally extending side sills (one of which is shown at 8) and transverse base members 9 extending from the center sill to the side sills. It will be understood both the underframe and the car body will be provided with additional bracing members and the like, the nature of which does not constitute a limitation on the present invention. Openings in the bottom of the exemplary hopper car of FIG. 1 are closed by opposed pairs of hopper doors 10-11, 12-13 14-15 and 16-17.

In FIG. 2 the center sill 7 of the hopper car of FIG. 1 is shown in broken lines. A door actuating beam 18 is mounted beneath center sill 7 by appropriate means (not shown) permitting the beam 18 to shift longitudinally. An upwardly directed extension 19 is affixed to beam 18 and passes through a slot 20 in center sill 7. A fluid cylinder 21 is mounted on center sill 7 or otherwise appropriately affixed to a frame member of the hopper car. For purposes of this discussion, fluid cylinder 21 may be considered to be an air cylinder. The piston rod 22 of cylinder 21 is operatively connected to the extension 19 of the door-actuating beam 18, as will be described hereinafter.

In FIG. 2 the door-actuating beam 18 is shown in its retracted door-closing position. When piston rod 22 of cylinder 21 is extended, the door-actuating beam 18 will be shifted to the right (as viewed in FIG. 2) to its extended door-opening position.

It will be understood that the transversely extending hopper doors 10 through 17 are each swingable between a closed position (shown in FIG. 1) and a downwardly depending open position. The means by which the longitudinal shifting of door-actuating beam 18 opens and closes doors 10 through 17 do not constitute a limitation of the present invention. Exemplary means to accomplish this purpose are taught in the above mentioned U.S. Pat. No. 3,596,609. Briefly, these means comprise a series of shafts extending transversely of the hopper car beneath the hopper doors. Each shaft carries a door lever non-rotatively mounted thereon. Each lever has one or more arms connected to one or more adjacent hopper doors by adjustable link means. Rotation of the shafts will cause the door levers and links thereon to shift the hopper doors to which they are connected between open and closed positions, passing through a dead center position. Each of the transverse shafts carries a centrally located lever. The door actuating beam 18 (see FIG. 2) is provided with a push rod for each centrally located shaft lever and operatively connected thereto. Through the agency of this combination of shaft, levers, links and push rods, a shifting of door-actuating beam 18 between its retracted door-closing position and extended door opening position will shift the hopper doors between their closed and opened positions.

The automatic latch means of the present invention is generally indicated at 23 in FIG. 2. For a better understanding of the latch means, reference is made to FIGS 3, 4 and 5 wherein like parts have been given like index numerals. As indicated above with respect to FIG. 2, the door-actuating beam 18 is mounted beneath and within center sill 7. The nature of the support means for the door-actuating beam 18 does not constitute a limitation on the present invention. Any appropriate support means permitting a longitudinal shifting of the door-actuating beam will suffice.

Extension 19 passing through a slot 20 of center sill 7 is welded or otherwise appropriately affixed to the door-actuating beam 18. The forward end of piston rod 22 is threaded as at 22a and is threadedly engaged in a bore 24 of a clevis 25. The forwardly extending bifurcations or arms 25a and 25b of clevis 25 are each provided with elongated slots 26 and 25a (see FIGS. 4 and 6). Extension 19 has near its upper end a transverse perforation 27. A shaft 28 passes through the extension perforation 27 and the clevis slots 26 and 26a. Near its ends, shaft 28 may be provided with transverse holes for the receipt of retaining pins 29 and 30 (such as cotter pins or the like) to prevent axial shifting of shaft 28. It will be evident that through the agency of clevis 25, shaft 28 and extension 19, the piston rod 22 of cylinder 21 is operatively connected to the dooractuating beam 18.

Figure 3:
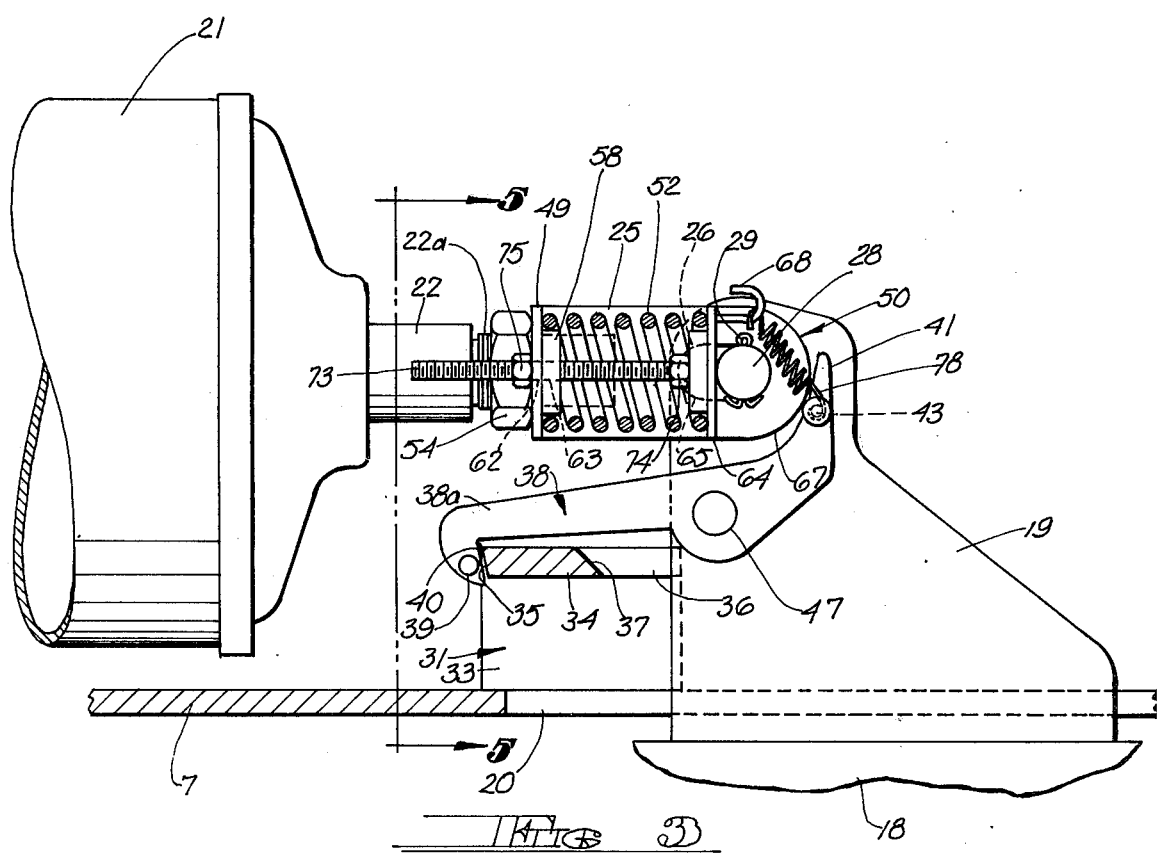
FIG. 3 is a fragmentary elevational view, partly in cross section, of the center sill, door-actuating beam, cylinder and latch means of FIG. 2.

A catch assembly, generally indicated at 31, is most clearly shown in FIG. 7. The catch assembly comprises a pair of upstanding legs 32 and 33 surmounted by a catch plate 34 welded or otherwise affixed to legs 32 and 33. As is shown in FIGS. 3 and 5 the catch assembly legs 32 and 33 are welded or otherwise affixed to the upper surface of center sill 7 and catch assembly 31 is so positioned as to straddle that end of center sill slot 20 nearest cylinder 21. It will be understood that catch assembly 31 could constitute an integral, one-piece structure.

That edge 35 of catch plate 34 facing cylinder 21 is undercut, as is most clearly shown in FIG. 3. The opposite edge of the catch plate is provided with a notch 36, te base portion 37 of which is radiased and constitutes a cam surface, the purpose of which will be described hereinafter.

A latch hook is generally indicated at 38. Referring to FIGS. 3, 8 and 9 latch hook 38 is made up of a pair of substantially identical hook-shaped members 38a and 38b with a similarly shaped separator member 38c therebetween. The members 38a through 38c are provided with coaxial perforations through which a hardened pin 39 extends. The pin 39 serves to prevent the latch hook 38 from falling through the slot to the extent that a caming action against surface 37 of catch plate 34 could not occur. The same purpose could be served by separate hardened pins welded or otherwise affixed to members 38a and 38b. Where a single pin 39 is used, the pin may serve to strengthen the structure and to maintain it in proper allignment while elements 38a through 38c are welded together. The hookshaped end of latch hook 38 is provided with an undercut latching surface 40. As in the case of the catch assembly 31, latch hook 38 could also constitute an integral, one-piece structure.

Since separator element 38c is shorter than elements 38a and 38b (See FIGS. 8 and 9) the free ends of elements 38a and 38b constitute in essence, bifurcations terminating in upstanding ears 41 and 42. Ears 41 and 42 have affixed thereto (by welding, threaded engagement or the like) laterally extending pins 43 and 44, respectively, the purpose of which will be described hereinafter.

Latch hook 38 is pivotally affixed to extension 19. To this end, latch hook elements 38a and 38b are provided with perforations 45 and 46, respectively. The extension is also provided with a perforation (not shown). As shown in FIG. 3, a pivot pin 47 passes through perforation 45, the perforation in extension 19 and perforation 46, thereby pivotally affixing latch hook 38 to extension 19. As is shown in FIG. 5, pivot pin 47 may be provided with a head 47a at one end and a transverse hole at the other to receive an appropriate fastening means 47b to prevent axial shifting of pivot pin 47. The fastening means 47b may take the form of a roll pin, cotter pin or the like. The non-headed end of pivot pin 47 could be threaded and provided with a nut to prevent axial shifting thereof. It will be understood that latch hook 38 cooperates with catch assembly 31 and the manner of this cooperation will be described hereinafter.

As indicated above, the latch means of the present invention is provided with a retarding assembly to prevent disengagement of latch hook 38 from catch assembly 31 due to impact inertia tending to advance the piston rod 22 and clevis 25. This retarding assembly comprises a spring base plate 49, a pair of spring retainers 50 and 51 and a pair of springs 52 and 53 (as shown in FIG. 4).

It will be remembered that the forward end of piston 22 is threaded as at 22a and is threadedly engaged in the bore 24 of clevis 25. This threaded engagement permits an axial adjustment of the clevis with respect to the piston rod and the clevis may be locked in adjusted position by a nut 54 threadedly engaged on the portion 22a of piston rod 22. Between clevis 25 and nut 54 there is located a spring base plate 49. Spring base plate 49 is most clearly shown in FIG. 10. It comprises a substantially rectangular plate-like member having a central perforation 55 adapted to just nicely receive the threaded portion 22a a of piston rod 22. Proper orientation of spring base plate 49 on piston rod portion 22a is assured by a pair of lugs 56 and 57 welded or otherwise affixed to the spring base plate 49. As is most clearly shown in FIGS. 4 and 5, when the spring base plate 49 is mounted on the portion 22a of piston rod 22 the lugs 56 and 57 will abut the side of clevis 25.

Spring base plate 49 is also provided with a pair of disc-like extensions 58 and 59 welded or otherwise appropriately affixed thereto. As is most clearly shown in FIG. 11, spring base plate 49 and disc-like extension 59 are provided with coaxial perforations 60 and 61. Similarly, spring base plate 49 and disc-like extension 58 are provided with coaxial perforations 62 and 63 (See FIG. 4). The disc-like extensions 58 and 59 serve to maintain spring alignment, as will be evident hereinafter. While spring base plate 49, lugs 56 and 57 and disc-like extensions 58 and 59 have been described as separate elements welded together, it will be understood by one skilled in the art that this assembly could constitute a one-piece, integral structure in the form of a casting or the like.

FIGS. 12 and 13 illustrate an alternate embodiment of spring base plate 49a. The spring base plate 49a is similar to spring base plate 49 of FIGS 10 and 11 and like parts have been given like index numerals. Spring base plate 49a differs from spring base plate 49 in that the disc-like extensions 58 and 59 have been eliminated and groups of lugs 58a and 59a have been substituted therefor to maintain spring alignment.

FIGS. 14 and 15 illustrate spring retainer 50. Spring retainer 50 comprises a rectangular plate 64, one side of which is provided with a disc-like extension 65. It will be understood that lugs similar to lugs 58a and 59a of FIG. 12 could be substituted for disc-like extension 65 to maintain spring alignment. Extension 65 has a perforation 66 extending therethrough. On the other side of plate 64 the spring retainer is provided with a U-shaped element 67. It will be understood that plate 64, extension 65 and element 67 may comprise separate parts welded or otherwise appropriately joined together. On the other hand, the spring retainer may constitute an integral, one-piece casting or the like. Finally, that surface of plate 64 bearing the U-shaped element 67 also carries a hook 68. The hook 68 may, for example, be made of rod stock or the like and may be affixed to plate 64 by welding or other appropriate means. Spring retainer 51 (see FIG. 4) is substantially identical to spring retainer 50 and to this end it comprises a rectangular plate 69, a disc-like extension 70 and a U-shaped member 71. Spring retainer 51 differs from spring retainer 50 only in that it is provided with a hook 72 similar to hook 68 but on the opposite side of the U-shaped element 51.

As can be most easily discerned in FIG. 4, one end of compression spring 52 abuts spring base plate 49, while the other end of spring 52 abuts spring retainer 50. The spring is maintained properly oriented with respect to spring base plate 49 and spring retainer 50 by virtue of spring base plate extension 58 and spring retainer extension 65. Both of these disc-like extensions serve as centering means for the spring 52.

Spring 52 is intended to be "preloaded", i.e. always in compression. To facilitate assembly of spring base plate 49, spring 52 and spring retainer 50, a threaded rod 73 may be provided. One end of rod 73 is welded or otherwise anchored in the perforation 66 of spring retainer 50 (see FIG. 16 or 17). Alternatively, the perforation 66 of spring retainer 50 may be threaded and that end of rod 73 may be threadedly engaged therein and locked in position by a nut 74, as shown in FIG. 3. The other end of rod 73 passes through the perforations 62 and 63 in spring base plate 49 and its extension 58 with clearance. A second nut 75 is located on rod 73 which may be tightened to adjust the assembly and hold it together. The assembly of spring base plate 49, spring 53 and spring retainer 51 is accomplished retainer 51 is accomplished in the same manner, spring retainer 51 being provided with a threaded rod 76, identical to threaded rod 73 and provided with an adjustment nut 77.

It will be noted from FIGS 3 and 4 that shaft 28 by which clevis 25 is operatively attached to extension 19 also passes through the U-shaped members 67 and 71 of spring retainers 50 and 51, respectively so that the retarding assembly as a whole is operatively connected between piston rod 22 and extension 19.

The assembly is completed by the provision of a pair of tension springs 78 and 79 (see FIGS. 3 and 4). Tension spring 78 is provided with hooked ends, one of which engages the laterally extending pin 43 on latch hook 38 and the other end of which engages hook 68 on spring retainer 50. In similar fashion, tension spring 79 is provided with hooked ends, one of which engages laterally extending pin 44 of latch hook 38 and the other of which engages hook 72 of spring retainer 51. Tension springs 78 and 79 bias latch hook 38 into engagement with catch assembly 31.

The structure of the latch means of the present invention having been described, its operation may now be set forth as follows. FIGS. 3 and 4 illustrate the latch means in its closed and latching condition. It will be noted that the undercut surface 40 of latch hook 38 engages the undercut surface 35 of catch assembly 31 preventing a shifting of door-actuating beam 18 and its extension 19 toward its door-opening position (i.e. to the right as viewed in FIGS. 3 and 4). Tension springs 78 and 79 will maintain latch hook 38 in its catch assembly-engaging position under all dynamic conditions of the hopper car.

Some play in the system is required, since on the return stroke the piston rod 22 must retract by sufficient amount to permit latch hook 38 to engage the surface 35 of catch assembly 31. The notch 36 of the catch assembly 31 allows beam 18 and extension 19 to shift to the left (as viewed in FIGS. 3 and 4) past normal closed position by an amount sufficient to assure that all doors have achieved their fully shut positions. Nevertheless, the retarding assembly will prevent an inadvertent disengagement of latch hook 38 from catch assembly 31 due to impact inertia tending to shift piston rod 22 and clevis 25 to the right as viewed in FIGS. 3 and 4. To this end it will be understood that the engagement of the latch hook 38 with catch assembly 31 will determine the right hand most position (as viewed in FIGS. 3 and 4) attainable by extension 19 and door-actuating beam 18 under latched conditions. As a consequence, the right-hand most position of shaft 28 and spring retainers 50 and 51 are also determined under latch conditions. Thus, piston rod 22 and clevis 25 are prevented from shifting to the right under impact inertia conditions by the preloaded springs 52 and 53. In actual test, excellent results have been achieved when springs 52 and 53 have been selected to prevent motion of the piston rod 22 under a 20G impact acceleration.

When it is desired to purposefully unlatch the door-actuating beam, fluid under pressure is introduced into cylinder 21 causing piston rod 22 and clevis 25 to shift to the right against the action of retarding assembly springs 52 and 53 toward latch hook ears 41 and 42. Since clevis portions 25a and 25b are provided with elongated slots 26 and 26a, respectively, the clevis can shift to the right without shifting shaft 28 and extension 19 to which it is attached when latch hook 38 is in engagement with surface 35 of catch assembly 31. During this portion of the latch opening procedure, door-actuating beam 18 and its extension 19, together with shaft 28 and the spring retainers 50 and 51 mounted thereon will remain stationary with latch hook 38 engaging catch assembly surface 35.

FIG. 16 is similar to FIG. 3 and like parts have been given like index numerals. FIG. 16 illustrates the latch mechanism at the instant that the latch hook ears 41 and 42 are first contacted by portions 25a and 25b of clevis 25. It will be noted that the ends of portions 25a and 25b are rounded and will cooperate with latch hook ears 41 and 42, respectively, with a caming action. At this instant of contact, it will be noted that the rearward ends of clevis slots 26 and 26a have not yet contacted shaft 28.

Continued shifting of piston rod 22 and clevis 25 to the right (as viewed in FIG. 16) will result in a pivoting of latch hook 38 about pivot pin 47 and against the action of tension or biasing springs 78 and 79.

FIG. 17 is similar to FIG. 16 but illustrates latch hook 38 in the position it assumes after Figure), with catch assembly 31. The latch hook 38 has become disengaged from catch assembly surface 35 and the rearmost ends of clevis slots 26 and 26a have contacted shaft 28. It will be evident from FIG. 17 that yet further movement of piston rod 22 and clevis 25 to the right (as seen in that Figure(, through the agency of extension 19, will result in a shifting of door-actuating beam 18 to its door-opening position.

When it is desired to close the doors, fluid pressure will be applied within cylinder 21 in such a way as to cause piston rod 22 and clevis 25 to shift to the left as viewed in FIGS. 3, 4, 16 and 17. Under these circumstances, the shaft 28 will be contacted by the forward ends of clevis slots 26 and 26a imparting a pulling force to the shaft 28, extension 19 and door-actuating beam 18. Since shaft 28 is engaged by the forward ends of clevis slots 26 and 26a, tension springs 78 and 79 will be free to pivot latch hook 38 to its latching position. As the latch hook approaches the catch assembly 31, the adjacent rounded end of the latch hook will contact the radiused base surface 37 of notch 36 in the catch plate 34, causing the latch hook to ride up over the top of catch plate 34 against the action of tension or biasing springs 78 and 79. As soon as the latch hook 38 clears the top of catch plate 34, the latch hook will be snapped to its latching position (as viewed in FIG. 3) by tension springs 78 and 79 assuring that beam 18 will be locked in its door-closing position and that the doors it controls will be locked in their closed positions. Again, there will be a little play in the system since in the closing operation the piston rod 22 and clevis 25 should travel to the left to a position slightly beyond that illustrated in FIG. 3 to assure that the latch hook 38 achieves its latching position with respect to the catch assembly 31 and the hopper doors have positively closed. Notch 37 in catch assembly plate 34 accomodates this action, as indicated above. Nevertheless, the cooperation of the latch hook 38 and catch assembly 31 will again define the right hand most position achieveable by door-actuating beam 18 under latched condition.

From the description above of the door-opening sequence, it will be understood that there will be a slight hesitation of the door-actuating beam 18 in its movement toward its door-opening position due to the unlatching sequence. However, the parts of the latch assembly are so designed and the forces of the system are balanced in such a way, that a slight acceleration of the beam will occur. Since the air volume of the cylinder is small at initiation of the door-opening sequence, the pressure drop within the cylinder due to the increased volume in the cylinder as the piston rod extends, plus the cushion effect at the exhaust portion of the cylinder, will control the motion at the start of the cycle to provide a smoother operation as the cycle passes through the unlatching sequence.

Modifications may be made in the invention without departing from the spirit of it.

The embodiments of the invention in which an exclusive property or privilege is claimed are defined as follows:

1. Automatic latch means for the door-actuating beam of a hopper car of the type having an elongated frame and a plurality of hopper doors hingedly affixed to said frame in opposed pairs and operatively connected to said door-actuating beam in such a way as to be swingable between a closed position and a downwardly depending open position when said door actuating beam is shifted longitudinally of said hopper car frame between a retracted door-closing position and an extended door-opening position by a fluid cylinder piston rod operatively attached thereto, said latch comprising a catch assembly mounted on said hopper car frame and a pivotable latch hook operatively attached to said beam, means to urge said latch hook into latching engagement with said catch assembly under all dynamic conditions of said hopper car when said door-actuating beam is in said door-closing position and cam means on said piston rod which, when said piston rod is advanced to shift said door-actuating beam to said door-opening position, first disengages said latch hook from said catch assembly prior to shifting said door actuating beam to said door-opening position.

2. The structure claimed in claim 1 including retarding means to prevent shifting of said piston rod and disengagement of said latch hook from said catch assembly when said hopper car is subject to impact inertia.

3. The structure claimed in claim 1 including an upwardly directed extension on said door-actuating beam, said beam extension having a first transverse perforation therethrough, a clevis mounted on the free end of said cylinder piston rod, the bifurcations of said clevis having elongated slots therein, said clevis bifurcations being located to either side of said beam extension, a shaft extending through said clevis slots and said first transverse perforation in said beam extension to operatively connect said clevis to said beam extension, said latch hook terminating at one end in a hooked configuration engageable with said catch assembly and terminating at the other end in bifurcations each having an upstanding ear, said latch hook bifurcations being holes to either side of said beam extension and being pivotally affixed thereto by a pivot pin passing through coaxial hole in said bifurcations and a second transverse perforation in said beam extension, said piston rod being shiftable between extended and retracted pistons, said clevis slots having forward ends engageable with said shaft to shift said door-actuating beam to said door-closing position when said piston rod is shifted from said extended to said retracted position, said clevis slots having rearward ends engageable with said shaft to shift said door-actuating beam to said door-opening position when said piston rod is shifted from said retracted position to said extended position, said clevis bifurcations having free forward ends engageable with said latch hook ears to pivot said latch hook out of engagement with said catch assembly when said piston rod is shifted from said retracted position toward said extended position and prior to shifting said door-actuating beam to said door-opening position.

4. The structure claimed in claim 3 wherein said hopper car frame is of the type having a longitudinally extending center sill, said door-actuating beam being parallel to said center sill and being located thereberneath, said center sill having an upper surface with an elongated slot therein through which said beam extension protrudes, said catch assembly being mounted on said upper surface of said center sill.

5. The structure claimed in claim 3 including retarding means to prevent shifting of said piston rod toward said extended position and disengagement of said latch hook from said catch assembly when said hopper car is subject to impact inertia, said retarding means comprising a spring base plate mounted on said piston rod adjacent said clevis and extending to either side of said clevis, a pair of plate-like spring retainers mounted on said shaft to either side of said beam extension, and a pair of compression springs located to either side of said clevis, each of said compression springs abutting said spring base plate at one of its ends and one of said spring retainers at the other of its ends, said compression springs being so sized as to constantly be in compression.

6. The structure claimed in claim 4 wherein said means to urge said latch hook into latching engagement with said catch assembly comprises a pair of tension springs located to either side of said beam extension, each of said tension springs being affixed at its one end to one of said latch hook ears and at its other end to the adjacent one of said spring retainers.

* * * * *